(12) United States Patent
Gienke et al.

(10) Patent No.: US 7,526,411 B2
(45) Date of Patent: Apr. 28, 2009

(54) DEVICE FOR REMOTE DIAGNOSTICS OF A FIELD DEVICE

(75) Inventors: Michael Gienke, Hannover (DE); Thoralf Schulz, Mentor, OH (US)

(73) Assignee: ABB AG, Mannheim (DE)

( * ) Notice: Subject to any disclaimer, the term of this patent is extended or adjusted under 35 U.S.C. 154(b) by 138 days.

(21) Appl. No.: 11/783,502

(22) Filed: Apr. 10, 2007

(65) Prior Publication Data
US 2007/0288204 A1 Dec. 13, 2007

(30) Foreign Application Priority Data
Apr. 29, 2006 (DE) .................. 10 2006 020 070

(51) Int. Cl.
G06F 11/00 (2006.01)
G01M 19/00 (2006.01)

(52) U.S. Cl. .............. 702/188; 702/122; 379/29.11; 379/29.01

(58) Field of Classification Search ......... 702/122, 702/188; 324/72, 76.11; 714/712, 724; 725/107; 708/160; 379/29.09, 29.11
See application file for complete search history.

(56) References Cited

U.S. PATENT DOCUMENTS 7,058,542 B2 * 6/2006 Hauhia et al. .............. 702/183
7,166,062 B1 * 1/2007 Watterson et al. ............ 482/8
2004/0075566 A1   4/2004 Stepanik et al.
2006/0075009 A1 * 4/2006 Lenz et al. ................. 708/160

FOREIGN PATENT DOCUMENTS

DE        42 38 957 A1    5/1994
DE   10 2005 007 017 A1   9/2006

OTHER PUBLICATIONS

Detlef Steinberg, "Interfaces Für Eigendiagnose-Testtool—Flexible Datenkommunikation Über Bluetooth Oder USB", Automotive News, Feb. 2005, 1 page.

* cited by examiner

Primary Examiner—Edward Raymond
Assistant Examiner—Elias Desta
(74) Attorney, Agent, or Firm—Buchanan Ingersoll & Rooney PC

(57) ABSTRACT

The invention relates to a device for remote diagnostics of a field device in a process engineering system that is part of a distributed control system. The field devices are connected to I/O units and are operated by a central device. The diagnostics device is functionally divided into a recording unit and a physically separate processing unit. The recording unit and the processing unit are logically connected to one another via a wireless communications link.

3 Claims, 2 Drawing Sheets

DEVICE FOR REMOTE DIAGNOSTICS OF A FIELD DEVICE

The invention relates to a device for remote diagnostics of a field device in a process engineering system that is part of a distributed control system.

Field devices of this type, such as sensors, actors and measuring transducers, are disposed in the field in a decentralized fashion close to the process.

Known field devices are connected to a central device by means of a multi-wire connection line, in which arrangement each field device is supplied with electrical energy for its operation and exchanges data with the central device via the connection line.

The central device usually comprises here a process control system or a stored-program controller and is equipped with input/output modules, referred to below as I/O modules for short, for connecting field devices. A hierarchically structured, distributed control system is known from DE 4,238,957 in which such I/O modules of central processing units are disposed spatially separate as remote input/output subsystems. It is furthermore set out in this document that devices for operating, monitoring and remote diagnostics are disposed on the highest hierarchical level and connected to the system bus.

In this arrangement the field device communicates exclusively with devices on the next higher hierarchical level, that is to say usually the I/O modules of the central processing units. Consequently, direct access to data of the field device by a higher, process controller-independent device, in order to record diagnostics information of the field device for example, is not possible. Accordingly, the diagnostics information also flows over all hierarchical levels. However, in this case a higher priority exists for the communication to perform the automation task, so that access to diagnostics information must wait for a free time window. This time behavior is considered to be disadvantageous. Moreover, in particular the technical outlay required in the intervening hierarchical levels in order to transport the diagnostics information is disadvantageous, especially in the case of system components in which the contents of the diagnostics information is not processed at all.

The object of the invention is therefore to improve the exchange of diagnostics information between a field device and a device for remote diagnostics in a hierarchically structured, distributed control system.

According to the invention, this object is achieved by the means set out in claim 1. Advantageous refinements of the invention are set out in the dependent claims.

The invention starts from a hierarchically structured, distributed control system in which the field devices are connected to I/O units and are operated by a central device in order to perform an automation task. Part of the hierarchically structured, distributed control system is a device for remote diagnostics of field devices.

According to the invention, the device for remote diagnostics of field devices is physically divided into a recording unit and a processing unit which are logically connected to one another by means of a wireless communications link.

An essential feature of the invention is that the recording unit is disposed in the vicinity of the field device and is looped into the communications path between the field device and the central control device. The processing unit on the other hand is accommodated in a control center.

The field-proximal access advantageously avoids any network load on the communications channels between higher hierarchical levels.

In addition, the recording unit can be upgraded without intervening in the configuration of the hierarchically structured, distributed control system.

It is advantageous that more capacity for the transmission of data is available in the communications channels between higher hierarchical levels, and more resources for performing an automation task are available in devices on the hierarchical levels.

The invention is explained in greater detail below with reference to exemplary embodiments. In the drawings required for this purpose:

Figure 1:
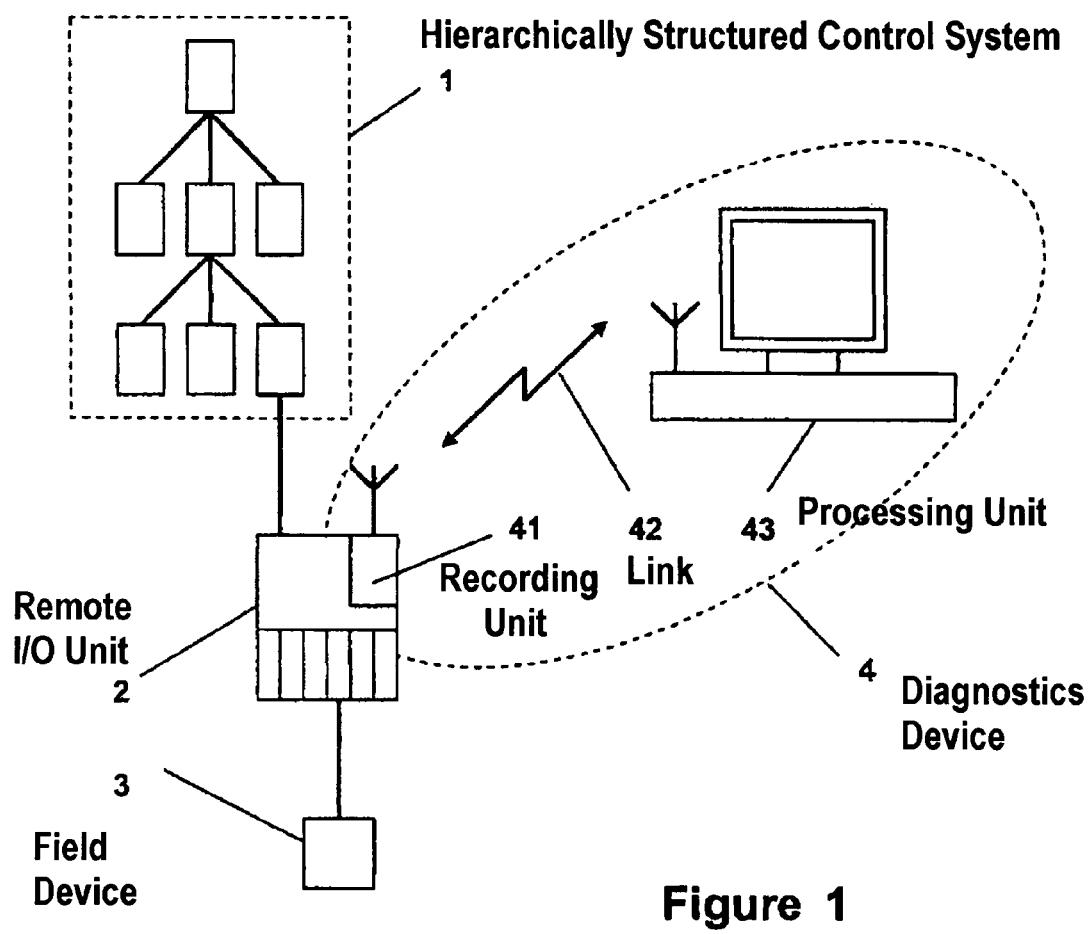
FIG. 1 shows a basic diagram of a device for remote diagnostics of a field device on an I/O unit.

FIG. 1 shows a hierarchically structured control system 1 to which a field device 3 is connected via a remote I/O unit 2. The field device 3 is connected via a field bus to the I/O unit 2. An I/O unit 2 of this kind is provided to connect a plurality of field devices 3. A field bus with a relatively low transmission rate is sufficient for communication with a single field device 3. Said field bus may be designed in particular in accordance with the HART specification. Provision may be made here for the field device 3 to be supplied with power via the field bus.

To operate a plurality of field devices 3, the I/O unit 2 is connected via a bus to the control system 1 at a comparatively higher transmission rate. Said bus may be designed in particular in accordance with the Profibus DP specification.

A diagnostics device 4 is provided for diagnostics of the field device 3. Said diagnostics device 4 is functionally divided into a recording unit 41 and a physically separate processing unit 43. The recording unit 41 and the processing unit 43 are logically connected to one another via a wireless communications link 42. In this arrangement the recording unit 41 is physically an integral part of the I/O unit 2.

During pauses in communication between the control system 1 and the field device 3, diagnostics data from the field device 3 is requested by the diagnostics device 4 via its recording unit 41 and transmitted into the processing unit 43 of the diagnostics device 4. This avoids disrupting the communication for performing the automation task.

Figure 2:
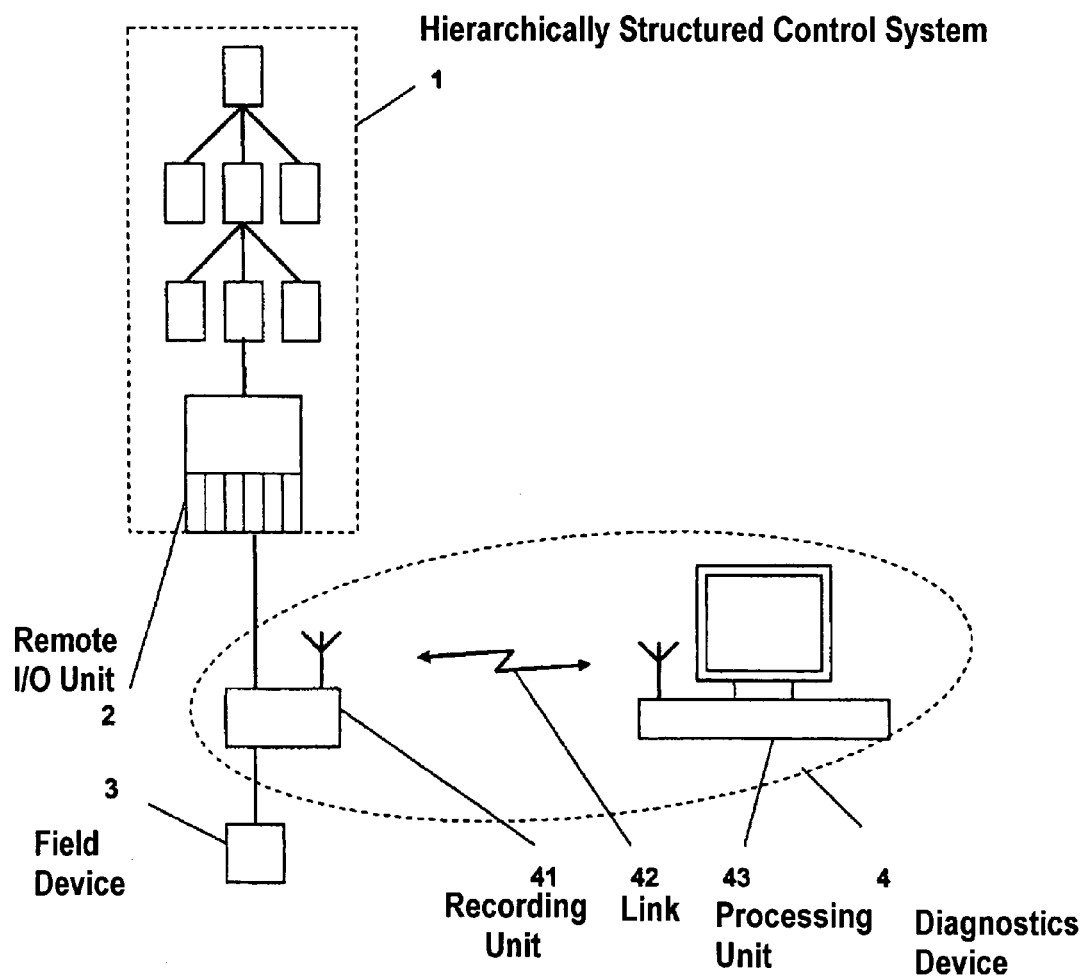
FIG. 2 shows a basic diagram of a device for remote diagnostics of a field device on a field bus line.

FIG. 2 shows, using the same reference numerals for the same means, another embodiment of the invention. It shows a hierarchically structured control system 1 to which a field device 3 is connected via an I/O unit 2. The I/O unit 2 is a direct part of the control system 1 here.

The field device 3 is connected via a field bus to the I/O unit 2. Said field bus may be designed in particular in accordance with the HART specification. Provision may be made here for the field device 3 to be supplied with power via the field bus.

A diagnostics device 4 is provided for diagnostics of the field device 3. Said diagnostics device 4 is functionally divided into a recording unit 41 and a physically separate processing unit 43. The recording unit 41 and the processing unit 43 are logically connected to one another via a wireless communications link 42.

The recording unit 41 is inserted into the field bus line leading to the field device 3 and recognizes the data stream carried over the field bus line. During pauses in communication between the control system 1 and the field device 3, diagnostics data from the field device 3 is requested by the diagnostics device 4 via its recording unit 41 and transmitted into the processing unit 43 of the diagnostics device 4. This avoids disrupting or putting more load on the communication for performing the automation task.

LIST OF REFERENCE NUMERALS

1 Control system
2 I/O device
3 Field device
4 Diagnostics device
41 Recording unit
42 Communications link
43 Processing unit

The invention claimed is:

1. A device for remote diagnostics of field devices in a hierarchically structured, distributed control system in which at least one field device is connected to I/O units and is operated by a central device in order to perform an automation task, comprising:
    a recording unit; and
    a physically separate processing unit, wherein
        the recording unit and the processing unit are logically connected to one another via a wireless communications link.

2. The device as claimed in claim 1, wherein the recording unit is physically assigned to the I/O unit.

3. The device as claimed in claim 1, wherein the recording unit is inserted into the field bus line leading to the at least one field device.

* * * * *